(12) United States Patent
Motoshima et al.

(10) Patent No.: US 10,897,561 B2
(45) Date of Patent: Jan. 19, 2021

(54) IMAGE SENSOR COMPRISING AN IMAGING MODULE INSTALLED IN A BODY MODULE AND A LENS MODULE

(71) Applicant: OMRON Corporation, Kyoto (JP)

(72) Inventors: Hiroaki Motoshima, Kyoto (JP);
Kosuke Watanabe, Kyoto (JP);
Yasuhito Uetsuji, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/387,497

(22) Filed: Apr. 17, 2019

(65) Prior Publication Data

US 2019/0356824 A1 Nov. 21, 2019

(30) Foreign Application Priority Data

May 17, 2018 (JP) .................................. 2018-095649

(51) Int. Cl.
*H04N 5/225* (2006.01)
*H04N 5/232* (2006.01)
*G02B 27/00* (2006.01)

(52) U.S. Cl.
CPC ....... *H04N 5/2254* (2013.01); *G02B 27/0025* (2013.01); *H04N 5/2252* (2013.01); *H04N 5/23296* (2013.01)

(58) Field of Classification Search
CPC ............. H04N 5/2254; H04N 5/23296; H04N 5/2252; H04N 5/3572; H04N 5/2258; H04N 5/217; G02B 27/0025; G02B 27/0012
See application file for complete search history.

(56) References Cited

U.S. PATENT DOCUMENTS

2013/0111464 A1\* 5/2013 Markas ............... G06F 9/44521
717/174
2016/0112646 A1\* 4/2016 Tsunoda ............. H04N 5/23296
348/240.2

FOREIGN PATENT DOCUMENTS

JP 6284276 2/2018

\* cited by examiner

*Primary Examiner* — Yogesh K Aggarwal
(74) *Attorney, Agent, or Firm* — JCIPRNET

(57) ABSTRACT

An image sensor capable of performing satisfactory distortion aberration correction on an imaging result, regardless of a combination of a lens module and an imaging module being used, is provided. A main body module of an image sensor acquires form information of each module from an imaging module and a lens module which are mounted thereon, acquires size information indicating a number of pixels and/or a pixel size of an imaging element within the imaging module and distortion aberration characteristic information indicating distortion aberration characteristics of an optical system within the lens module from a predetermined device on the basis of the acquired form information, and performs distortion aberration correction using the acquired information.

20 Claims, 8 Drawing Sheets

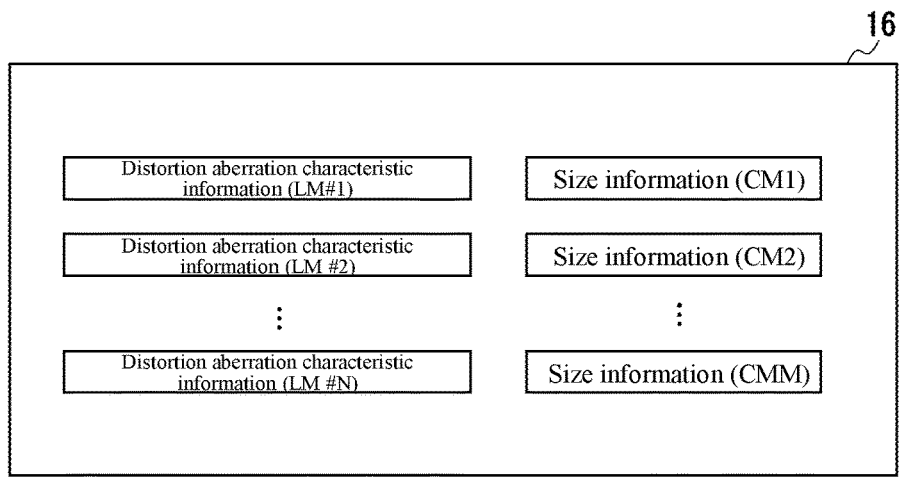
FIG. 4
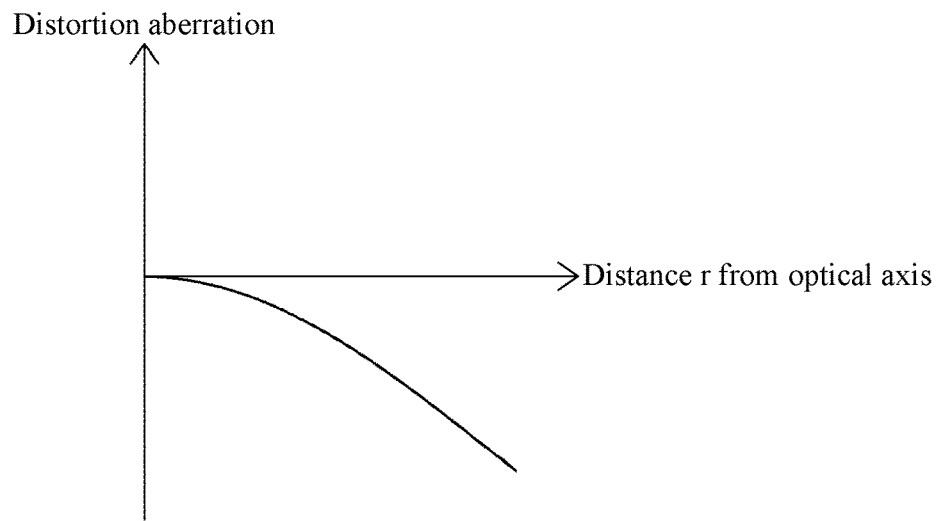
FIG. 5
| Distance r from optical axis[mm] | 0.0 | 0.1 | 0.2 | | 10.0 |
|---|---|---|---|---|---|
| Distortion aberration[%] | 0.00 | −0.01 | −0.03 | | −3.00 |
FIG. 6

IMAGE SENSOR COMPRISING AN IMAGING MODULE INSTALLED IN A BODY MODULE AND A LENS MODULE

CROSS-REFERENCE TO RELATED APPLICATION

This application claims the priority of Japan patent application serial no. 2018-095649, filed on May 17, 2018. The entirety of the above-mentioned patent application is hereby incorporated by reference herein and made a part of this specification.

BACKGROUND

Technical Field

The disclosure relates to a modular type image sensor constituted by a combination of a plurality of modules.

Description of Related Art

In production lines of factories, image processing systems have been used in order to automate product inspection and management and save labor. Although a system in which a camera and an image processing device are connected to each other through a cable (see Japanese Patent No. 6284276) has been generally used as an image processing system for a production line, an image processing system in which a camera and an image processing device are integrated so that imaging and image processing can be performed by a single device has also been developed, recently.

The angle of view and resolution of an imaging result (image data) which are desired for an image processing system in which a camera and an image processing device are integrated with each other (hereinafter referred to as an image sensor) vary depending on the size of an inspection target, an installation environment, and the like. For this reason, in the related art, manufacturers providing image sensors line up a large number of products having different specifications such as an angle of view, and users can select products having optimal specifications.

However, as IoT development in factories accelerates, the scope of application of image sensors is expanding, which makes it difficult to provide product variations that cover users' needs as they diversify. In addition, a need to change a portion of an image sensor (an optical system, an imaging element) in order to achieve optimization for inspection with short cycles of changes in an inspection target such as mass customization to meet the preference of each customer for differentiation from competitors in competition for commodities, expansion of provision of seasonal products, and a reduction in the lifecycle of a digital apparatus commodity represented by a smartphone has also been increasing.

For this reason, modulizing an optical system and an imaging element of an image sensor so that a user can freely combine the optical system and the imaging element with each other can be conceived. However, since details of distortion aberration correction to be performed on an imaging result vary depending on a combination of the optical system and the imaging element, realization of an image sensor performing satisfactory distortion aberration correction on an imaging result regardless of a combination of the optical system and the imaging element being used is not possible when the image sensor is simply modulized.

SUMMARY

According to an embodiment, an image sensor includes a main body module and a lens module and an imaging module mounted on the main body module, in which the main body module includes a first acquisition unit which acquires imaging module form information indicating a form of the imaging module from the mounted imaging module and acquires lens module form information indicating a form of the lens module from the mounted lens module, a second acquisition unit which acquires size information indicating a number of pixels and/or a pixel size of an imaging element within the mounted imaging module and distortion aberration characteristic information indicating distortion aberration characteristics of an optical system within the mounted lens module from a predetermined device by using the imaging module form information and the lens module form information acquired by the first acquisition unit, and a correction unit which performs distortion aberration correction on image data output by the imaging module using the size information and the distortion aberration characteristic information acquired by the second acquisition unit.

According to another embodiment, an image sensor includes a main body module, and a lens module and an imaging module mounted on the main body module, in which the imaging module includes an imaging element, and a correction unit capable of setting information for distortion aberration correction, which performs distortion aberration correction on image data output by the imaging element by using the set information for distortion aberration correction, and the main body module includes a first acquisition unit which acquires imaging module form information indicating a form of the imaging module from the mounted imaging module and acquires lens module form information indicating a form of the lens module from the mounted lens module, a second acquisition unit which acquires size information indicating a number of pixels and/or a pixel size of the imaging element within the mounted imaging module and distortion aberration characteristic information indicating distortion aberration characteristics of an optical system within the mounted lens module from a predetermined device by using the imaging module form information and the lens module form information acquired by the first acquisition unit, and a setting unit which sets the size information and the distortion aberration characteristic information acquired by the second acquisition unit in the correction unit of the imaging module as the information for distortion aberration correction.

BRIEF DESCRIPTION OF THE DRAWINGS

FIG. 4 is a diagram illustrating information written in an information storage unit within the main body module.

FIG. 5 is a diagram illustrating distortion aberration characteristics.

FIG. 6 is a diagram illustrating an example of a data structure of distortion aberration characteristic information.

DESCRIPTION OF THE EMBODIMENTS

Figure 1:
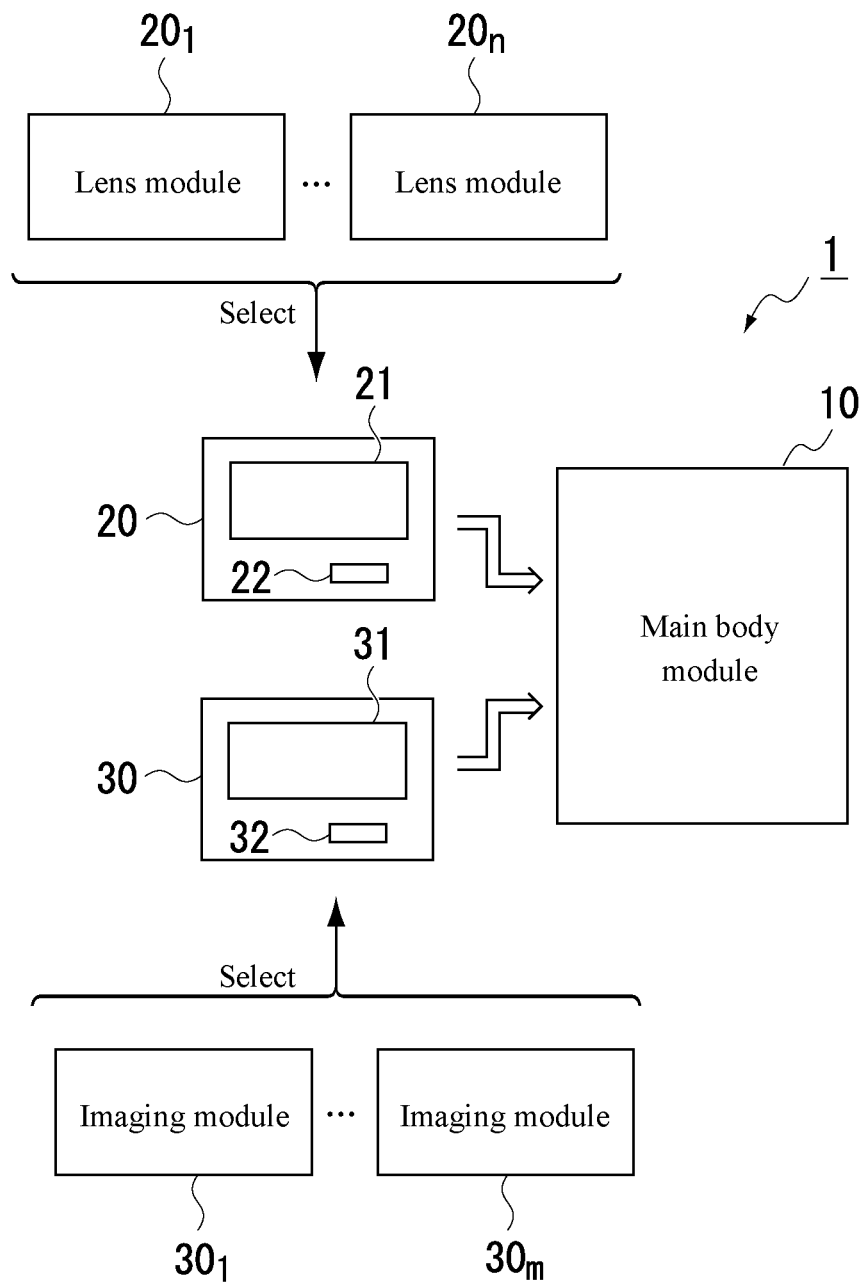
FIG. 1 is a diagram illustrating a schematic configuration of an image sensor according to a first embodiment.

The disclosure provides an image sensor which is constituted by a main body module, and a lens module and an imaging module mounted on the main body module, and which is capable of performing satisfactory distortion aberration correction on an imaging result regardless of a combination of the lens module and the imaging module being used.

The image sensors according to the above-described aspects have a configuration in which details of distortion aberration correction performed by the correction unit vary depending on a combination of the lens module and the imaging module mounted on the main body module. Therefore, the image sensors of the above-described aspects can obtain image data that is satisfactorily subjected to distortion aberration correction with any combination of the lens module and the imaging module mounted on the main body module.

In order to make it possible to provide the respective pieces of form information (the lens module form information and the imaging module form information) to the main body module, any configuration may be mounted on the respective mounting modules (the lens module and the imaging module). In an embodiment, each of the mounting modules may be provided with a memory that stores form information indicating the form of the module. In addition, each of the mounting modules may be provided with a resistor having a resistance value based on the form of the module, a DIP switch or a circuit equivalent to a DIP switch in which each switch is turned on or turned off to indicate the form of the module, and the like.

In addition, the "predetermined device" in the image sensor according to each aspect may be a non-volatile memory included in the main body module or may be a device provided externally.

In addition, the distortion aberration characteristics of the zoomable lens module (optical system) vary depending on a zoom setting value. Therefore, in a case where the image sensor of each aspect is realized as a sensor in which a zoomable lens module is selectable, according to an embodiment, the image sensor of each aspect may adopt a configuration in which "the predetermined device stores the distortion aberration characteristic information for each zoom setting value capable of being set in a zoomable lens module with respect to the lens module, and the second acquisition unit of the main body module acquires the distortion aberration characteristic information associated with the lens module form information acquired by the first acquisition unit and the zoom setting value of the zoomable lens module mounted on the main body module from the predetermined device in a case where the zoomable lens module is mounted on the main body module."

According to the disclosure, it is possible to provide an image sensor which is capable of performing satisfactory distortion aberration correction on an imaging result regardless of a combination of a lens module and an imaging module being used.

Hereinafter, embodiments of the disclosure will be described with reference to the accompanying drawings.

First Embodiment

Figure 2:
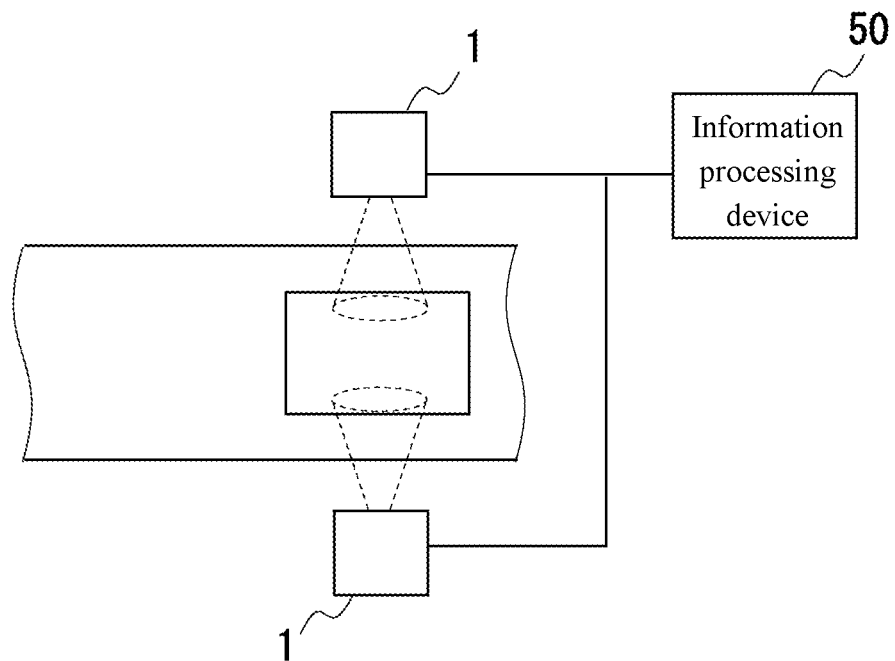
FIG. 2 is a diagram illustrating an example of the use of the image sensor.

FIG. 1 illustrates a schematic configuration of an image sensor 1 according to the present embodiment, and FIG. 2 illustrates an example of the use of the image sensor 1.

As illustrated in FIG. 1, the image sensor 1 of the present embodiment is a device configured by mounting a lens module 20 and an imaging module 30 on a main body module 10. In addition, as illustrated in FIG. 2, the image sensor 1 is developed on the assumption that the image sensor is used by being provided at a plurality of locations of a production line or the like and processing results of the respective image sensors 1 are collected by one information processing device 50.

The imaging module 30 (FIG. 1) is a module including an imaging element 31 such as a CMOS image sensor or a CCD image sensor. As the imaging module 30 mountable on the main body module 10, imaging modules $30_1$ to $30_m$ of m types having different specifications of the imaging element 31 (a pixel size and the number of pixels (the numbers of pixels in the X direction and the Y direction)) are prepared. A non-volatile memory 32 such as a serial EEPROM is provided inside each imaging module 30, and imaging module form information (hereinafter referred to as CM form information) indicating the form of the imaging module 30 is stored in the non-volatile memory 32 of each imaging module 30.

The lens module 20 is a module including an optical system 21 for forming an image of light emitted from an imaging target on an image surface of the imaging element 31. As the lens module 20, lens modules $20_1$ to $20_n$ of n types having different distortion aberration characteristics of the optical system 21 are prepared. A non-volatile memory 22 such as a serial EEPROM is provided inside each lens module 20, and lens module form information (hereinafter referred to as LM form information) indicating the form of the lens module 20 is stored in the non-volatile memory 22 of each lens module 20.

The main body module 10 is a module that performs distortion aberration correction on image data received from the imaging module 30 and performs various processes (a process of reading a bar code or the like, a process of determining whether or not an abnormality has occurred, and the like) by analyzing the image data that is subjected to the distortion aberration correction.

Figure 3:
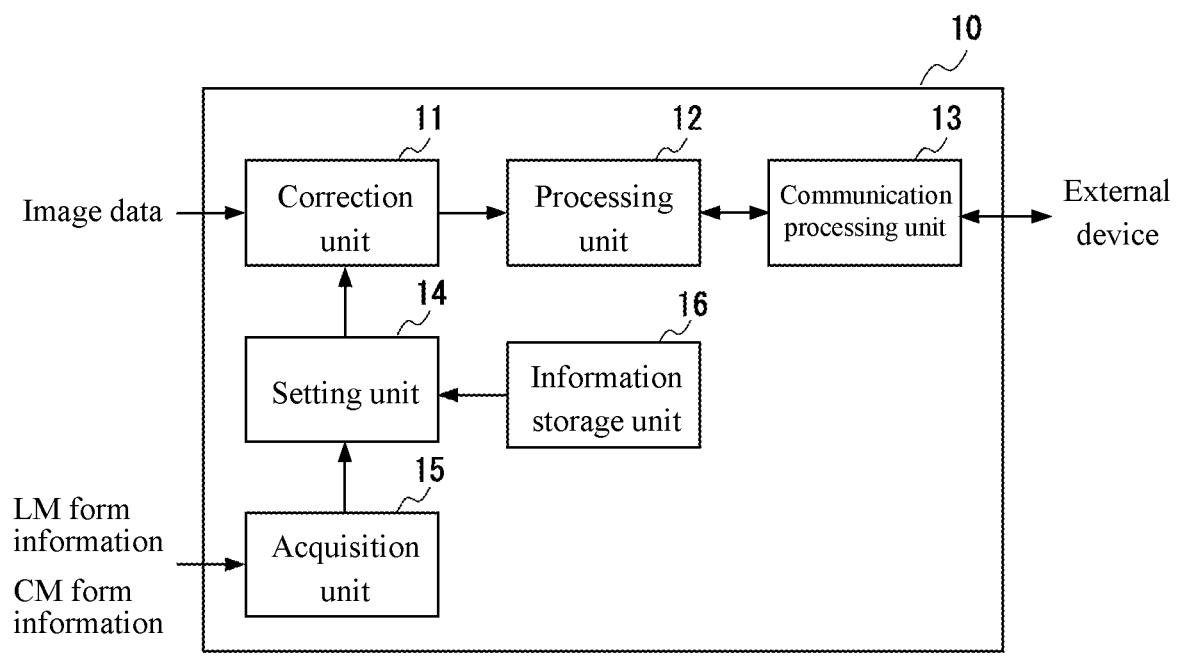
FIG. 3 is a functional block diagram of a main body module of the image sensor.
Figure 7:
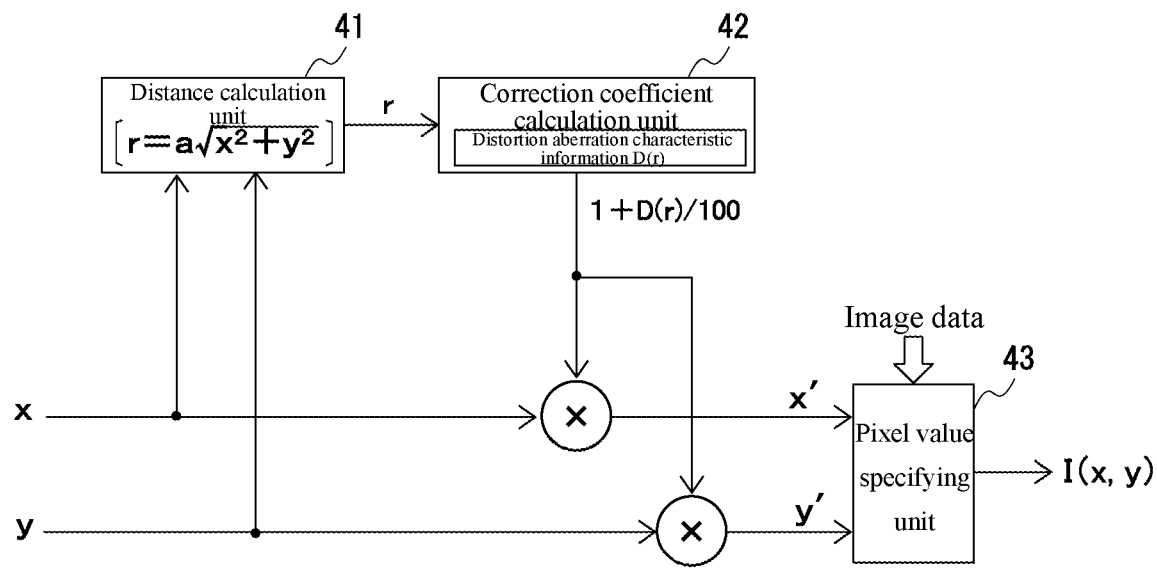
FIG. 7 is a functional block diagram of a correction unit within the main body module.
Figure 8:
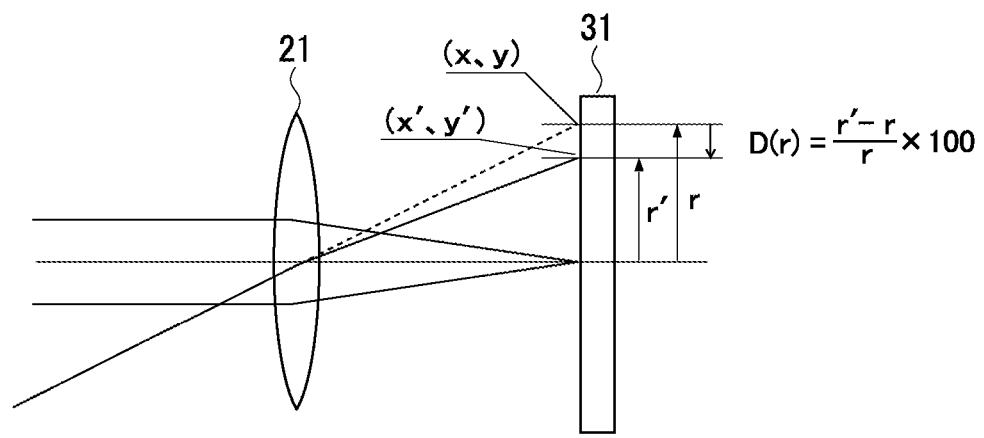
FIG. 8 is a diagram illustrating details of a correction process performed by the correction unit.

Hereinafter, a configuration and operations of the main body module 10 will be described with reference to FIGS. 3 to 8. Meanwhile, among these drawings, FIG. 3 is a functional block diagram of the main body module 10, and FIG. 4 is a diagram illustrating information stored in the information storage unit 16 provided within the main body module 10. FIG. 5 is a diagram illustrating distortion aberration characteristics, and FIG. 6 is a diagram illustrating an example of a data structure of distortion aberration characteristic information. FIG. 7 is a functional block diagram of the correction unit 11 provided within the main body module 10, and FIG. 8 is a diagram illustrating details of a correction process performed by the correction unit 11.

As illustrated in FIG. 3, the main body module 10 includes the correction unit 11, a processing unit 12, a communication processing unit 13, a setting unit 14, an acquisition unit 15, and an information storage unit 16.

The information storage unit 16 within the main body module 10 is a rewritable non-volatile storage device (for example, a flash memory) having a relatively large capacity. As illustrated in FIG. 4, size information on each imaging module 30 and distortion aberration characteristic information on each lens module 20 are stored in the information storage unit 16 in association with form information of each module (LM1, CM1, and the like in FIG. 4).

Size information on a certain imaging module 30 which is stored in the information storage unit 16 is information indicating a pixel size and the number of pixels (the numbers of pixels in the X direction and the Y direction) of the imaging element 31 included in the imaging module 30.

Distortion aberration characteristic information on a certain lens module 20 which is stored in the information storage unit 16 is information indicating distortion aberration characteristics of the optical system 21 included in the lens module 20.

A distortion aberration of the optical system 21 varies, for example, as illustrated in FIG. 5 depending on a distance r from an optical axis. Here, the distortion aberration (hereinafter also referred to as D(r)) is a value represented by the following expression when distances of an ideal image and a real image from the optical axis are respectively denoted by r and r'.

$$D(r)\ [\%] = 100 \cdot (r'-r)/r \quad (1)$$

Meanwhile, barrel type distortion occurs in a distortion aberration characteristic illustrated in FIG. 5 in which the value of each D(r) is a negative value. The value of each D(r) may be a positive value in a distortion aberration characteristic, and the sign of the value of D(r) may vary depending on the value of r. Bobbin type distortion occurs in the former case, and so-called conical hat type distortion occurs in the latter case.

The respective pieces of distortion aberration characteristic information stored in the information storage unit 16 may be respective coefficients of a polynomial expression (for example, a quintic polynomial) of r for approximating distortion aberration characteristics (r dependency of a distortion aberration) as illustrated in FIG. 5. In addition, the respective pieces of distortion aberration characteristic information stored in the information storage unit 16 may be information constituted by distortion aberrations with respect to various r values as schematically illustrated in FIG. 6.

The communication processing unit 13 (FIG. 1) is a communication interface circuit such as a network interface circuit.

The processing unit 12 is a unit that performs various processes (a process of reading a code, a process of determining whether or not an abnormality has occurred, and the like) by analyzing image data that is subjected to distortion aberration correction by the correction unit 11 (details will be described later). The processing unit 12 notifies an external device (an information processing device 50 or the like) of processing results by using the communication processing unit 13.

The acquisition unit 15 is a unit that reads out LM form information and CM form information from the non-volatile memories 22 and 32 of the lens module 20 and the imaging module 30 mounted on the main body module 10 and notifies the setting unit 14 of the read-out information when power is supplied to the main body module 10, or the like. The setting unit 14 is a unit that reads from the information storage unit 16 the distortion aberration characteristic information and the size information respectively associated with the LM form information and the CM form information notified from the acquisition unit 15, and sets the read information in the correction unit 11. The setting unit 14, and the processing unit 12 and the acquisition unit 15 described above, are realized by, for example, a micro controller in which programs for the image sensor 1 are stored.

The correction unit 11 is a unit that performs distortion aberration correction of details specified by the set distortion aberration characteristic information and size information on image data received from the imaging module 30. The correction unit 11 is normally realized by an IC for image processing (FPGA, ASIC, or the like). However, the correction unit 11 may be a unit that performs distortion aberration correction by software.

As illustrated in FIG. 7, the correction unit 11 includes a distance calculation unit 41, a correction coefficient calculation unit 42, a multiplier M1, a multiplier M2, and a pixel value specification unit 43. Meanwhile, in this drawing and the following description of this drawing, x and y represent pixel coordinates in a coordinate system with the position of the optical axis as the origin (0, 0). In addition, the correction unit 11 ascertains a coordinate range to be processed from the set number of pixels (the numbers of pixels in the X direction and the Y direction), and the respective units within the correction unit 11 operates as follows with respect to the respective pixel coordinates within the coordinate range to be processed.

The distance calculation unit 41 calculates a distance r of a pixel from the optical axis (a pixel at the position of the optical axis) using coordinates (x,y) of the pixel for which a pixel value is to be calculated and a set pixel size "a". The correction coefficient calculation unit 42 calculates D (r) from the distance r using the set distortion aberration characteristic information and calculates a correction coefficient "1+D (r)/100" from the calculated D(r). Meanwhile, in a case where information as illustrated in FIG. 6 is adopted as distortion aberration characteristic information, a unit that calculates D(r) from a weighted average of distortion aberrations in two distances before and after the distance r, and the like in the distortion aberration characteristic information is, in an embodiment, adopted as the correction coefficient calculation unit 42. However, in the above-described case, a unit having a distortion aberration of D(r) associated with the shortest distance from the distance r in the distortion aberration characteristic information may be adopted as the correction coefficient calculation unit 42.

The multiplier M1 calculates x' by multiplying the correction coefficient calculated by the correction coefficient calculation unit 42 by x, and the multiplier M2 calculates y' by multiplying the same correction coefficient by y. In addition, the pixel value specification unit 43 obtains a pixel value of coordinates (x', y') from image data before distortion aberration correction and outputs the obtained pixel value as a pixel value I(x,y) of image data after the distortion aberration correction. The pixel value specification unit 43 may be either a unit that obtains the pixel value of coordinates (x', y') using a nearest neighbor method or a unit that obtains the pixel value of coordinates (x', y') using another method (a bi-linear method, a bicubic method, or the like).

Here, the significance of the above-described process using the correction unit 11 will be described.

As illustrated in FIG. 8, when a distortion aberration occurs in the optical system 21, the light to reach the coordinate (x,y) in which a distance from the optical axis is r reaches the coordinate (x·r'/r, y·r'/r). Therefore, when a pixel value of the coordinate (x·r'/r, y·r'/r) is obtained from image data before distortion aberration correction, it is possible to obtain element data (a pixel value of the coordinate (x,y)) of image data after the distortion aberration correction.

In addition, when Expression (1) which is a definition expression of a distortion aberration D(r) is solved for "r'/r", the following expression (2) is obtained.

$$r'/r = 1 + D(r)/100 \qquad (2)$$

Therefore, when "1+D(r)/100" is multiplied by x and y, "x·r'/r" (=x') and "y·r'/r" (=y') can be obtained. In addition, since x' and y' are normally non-integral, a pixel value of the coordinate (x', y') is obtained by the pixel value specification unit 43 using a nearest neighbor method or the like.

As described above, the main body module 10 of the image sensor 1 can perform distortion aberration correction of details based on a combination of the lens module 20 and the imaging module 30 mounted thereon on image data received from the imaging module 30. Therefore, when the above-described configuration is adopted, it is possible to realize the image sensor 1 enabling a user to select the lens module 20 and the imaging module 30 without considering performance degradation due to a distortion aberration.

Second Embodiment

Hereinafter, a configuration and operations of an image sensor 1 according to a second embodiment will be described focusing on portions different from those of the image sensor 1 according to the first embodiment by using the same reference numerals and signs as those used when the image sensor 1 according to the first embodiment is described. Meanwhile, for convenience of description, an image sensor 1 according to an L-th (L=1, 2) embodiment will also be hereinafter referred to as an L-th image sensor 1.

Figure 9:
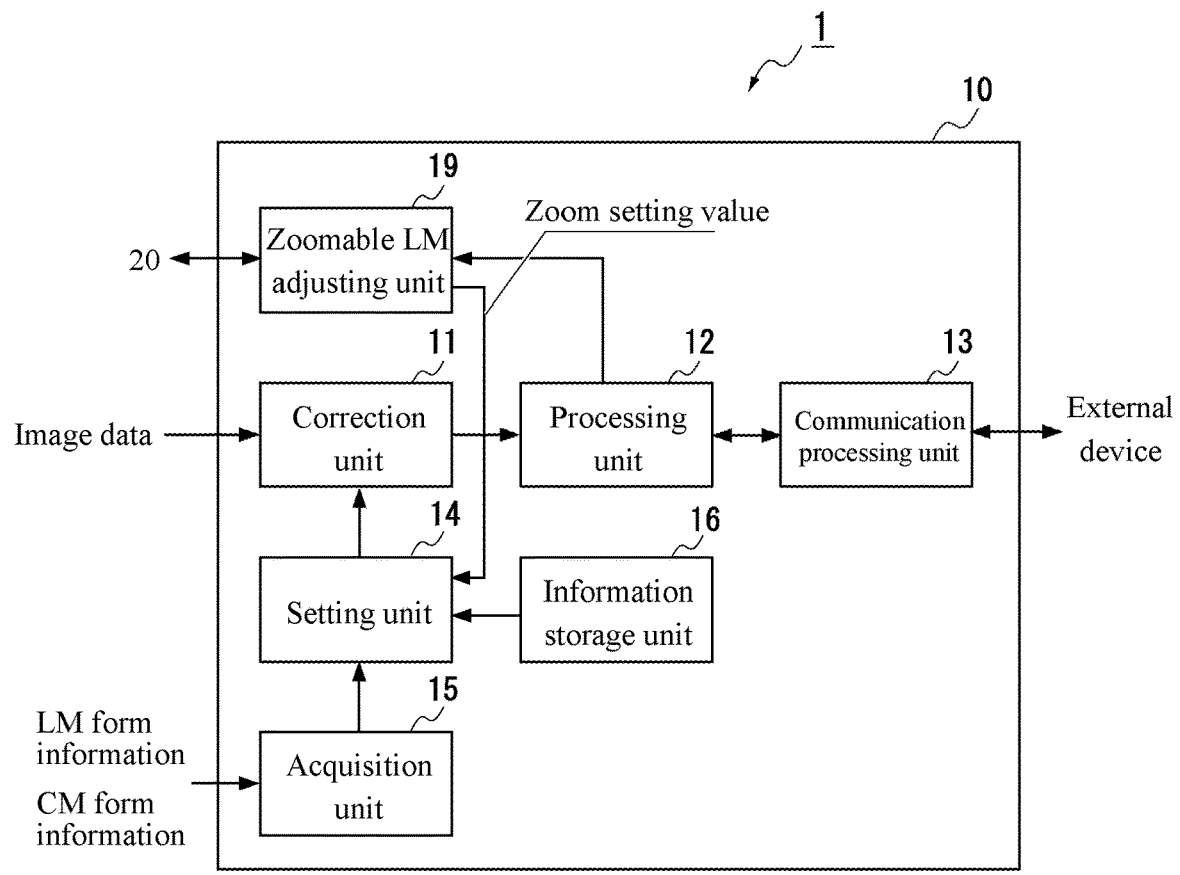
FIG. 9 is a diagram illustrating a schematic configuration of an image sensor according to a second embodiment.

FIG. 9 illustrates a schematic configuration of a second image sensor 1 (the image sensor 1 according to the second embodiment).

The second image sensor 1 is a device which is configured by mounting a lens module 20 and an imaging module 30 on a main body module 10, similar to the first image sensor 1 (see FIG. 1). The imaging module 30 for the second image sensor 1 is the same as the imaging module 30 for the first image sensor 1. However, the lens module 20 for the second image sensor 1 includes zoomable lens modules 20 (hereinafter, referred to as zoomable LMs 20) of k (≥1) types.

For this reason, the main body module 10 of the second image sensor 1 includes a zoomable LM adjusting unit 19 for changing setting related to zoom of the zoomable LM 20. Meanwhile, the zoomable LM adjusting unit 19 has a function of notifying a setting unit 14 of the present (after change) zoom setting value at the time of changing setting of zoom and a function of notifying the setting unit 14 of the present zoom setting value in response to a predetermined request received from the setting unit 14.

Figure 10:
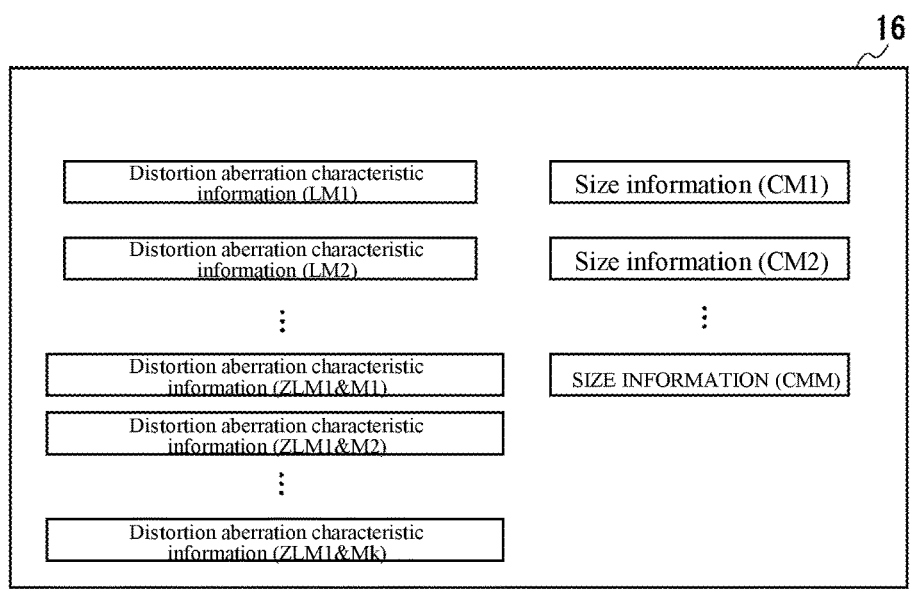
FIG. 10 is a diagram illustrating information stored in an information storage unit within a main body module of the image sensor according to the second embodiment.

When the zoom setting value of the zoomable LM 20 is changed, an exit pupil position is changed, and as a result, distortion aberration characteristics are changed. In order to make it possible to cope with such a change, an information storage unit 16 of the main body module 10 of the second image sensor 1 stores distortion aberration characteristic information for each zoom setting value capable of being set in the zoomable LM 20 with respect to the zoomable LM 20. More specifically, in a case where there are k zoomable LMs 20 for which zoom setting can be performed and LM form information of the zoomable LM 20 is ZLM1, the information storage unit 16 stores k pieces of distortion aberration characteristic information which associated with the LM form information ZLM1 and respective zoom setting values among zoom setting values M1 to Mk, as schematically illustrated in FIG. 10.

In addition, the main body module 10 of the second image sensor 1 is configured (programmed) such that the setting unit 14 performs the following processes.

In a case where LM form information and CM form information are notified from an acquisition unit 15, the setting unit 14 determines whether or not the lens module 20 mounted on the main body module 10 is a zoomable LM 20 on the basis of the notified CM form information. In a case where the lens module 20 mounted on the main body module 10 is not a zoomable LM 20, the setting unit 14 reads out distortion aberration characteristic information and size information which are associated with the LM form information and the CM form information notified from the acquisition unit 15 and sets the read-out information in a correction unit 11.

On the other hand, in a case where the lens module 20 mounted on the main body module 10 is a zoomable LM 20, the setting unit 14 acquires the present zoom setting value from a zoomable LM adjusting unit 19. In addition, the setting unit 14 reads from the information storage unit 16 the distortion aberration characteristic information associated with a combination of the LM form information notified from the acquisition unit 15 and the zoom setting value acquired from the zoomable LM adjusting unit 19 and sets the read distortion aberration characteristic information in the correction unit 11. The setting unit 14 also performs a process of reading from the information storage unit 16 the size information associated with the CM form information notified from the acquisition unit 15 and setting the read size information in the correction unit 11.

In a case where the present zoom setting value is notified from the zoomable LM adjusting unit 19, the setting unit 14 reads from the information storage unit 16 the distortion aberration characteristic information, which is associated with LM form information notified from the acquisition unit 15 when power is supplied and a combination of a zoom setting value notified this time from the zoomable LM adjusting unit 19 and a diaphragm setting value, and sets the read distortion aberration characteristic information in the correction unit 11.

As described above, also in a case where the zoom of the zoomable LM 20 is changed, the main body module 10 of the image sensor 1 according to the present embodiment can perform distortion aberration correction of details based on conditions after the change on image data received from the imaging module 30. Therefore, when the above-described configuration is adopted, it possible to realize the image sensor 1 enabling a user to select the lens module 20 and the imaging module 30 and also select the zoomable LM 20 as the lens module 20 without considering performance degradation due to a distortion aberration.

MODIFICATION EXAMPLE

Figure 11:
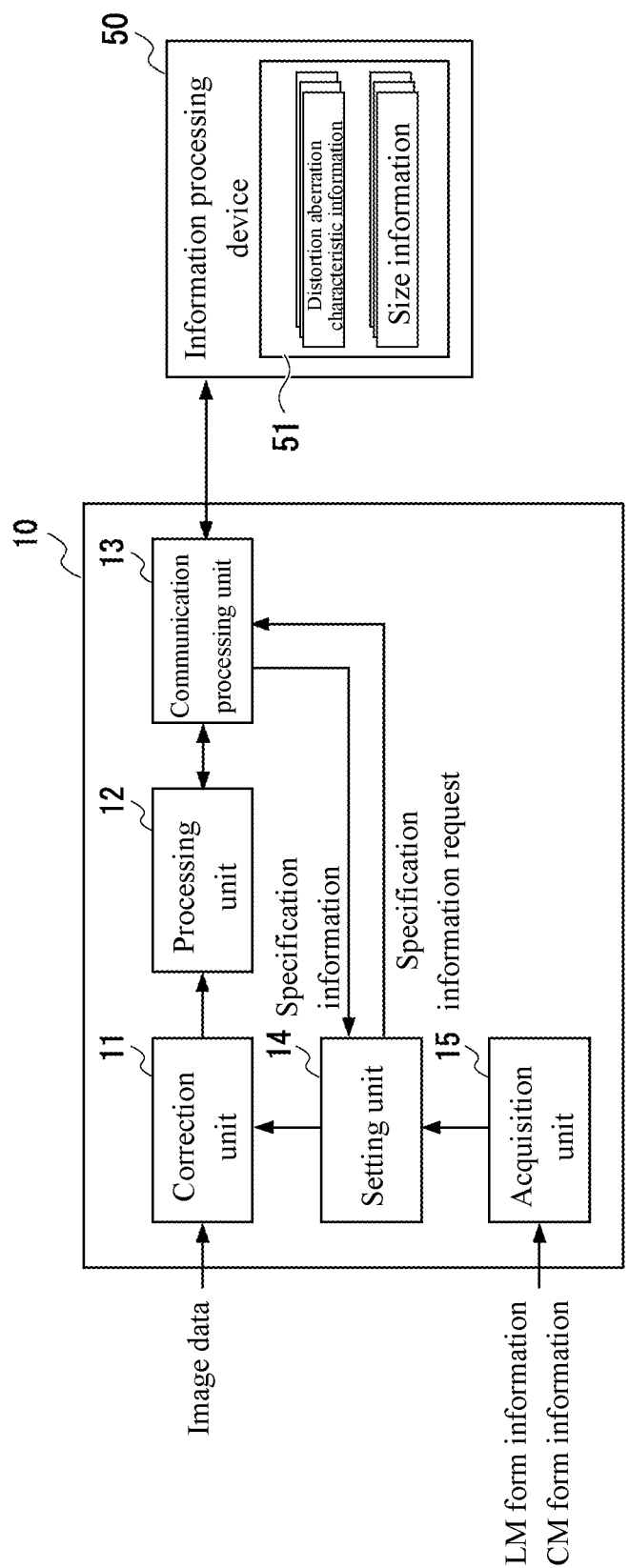
FIG. 11 is a diagram illustrating a modification example of the image sensor.

Various modifications can be made to the image sensors 1 according to the above-described embodiments. For example, after an external device (the information processing device 50, other image sensors 1, a storage on the Internet, or the like) storing the distortion aberration characteristic correction information and the size information for each module is prepared, the main body module 10 of the image sensor 1 according to each of the embodiments may be modified to a module that acquires the information based on the lens module 20 and the imaging module 30 which are mounted thereon from the external device. Meanwhile, in a case where the main body module 10 of the image sensor 1 according to the first embodiment is modified to such a module, the information storage unit 16 is removed from the main body module 10, for example, as illustrated in FIG. 11, and the setting unit 14 may be modified to a unit that acquires the distortion aberration correction information and the size information (specification information in the drawing) from the external device (the information processing device 50 in the drawing) by transmitting a specification information request including the LM form information and the CM form information notified from the acquisition unit 15.

Further, in a case where desired information is not stored in the information storage unit 16, the setting unit 14 of the main body module 10 according to each of the embodiments may be modified to a module that acquires the information from an external device. The lens module 20 may be modified to a module which is provided with a resistor having a resistance value based on the form of the module, a DIP switch in which each switch is turned on or turned off so as to indicate the form of the module, a circuit equivalent to the DIP switch, and the like, instead of the non-volatile memory 22. The same modification can also be made to the imaging module 30.

Figure 12:
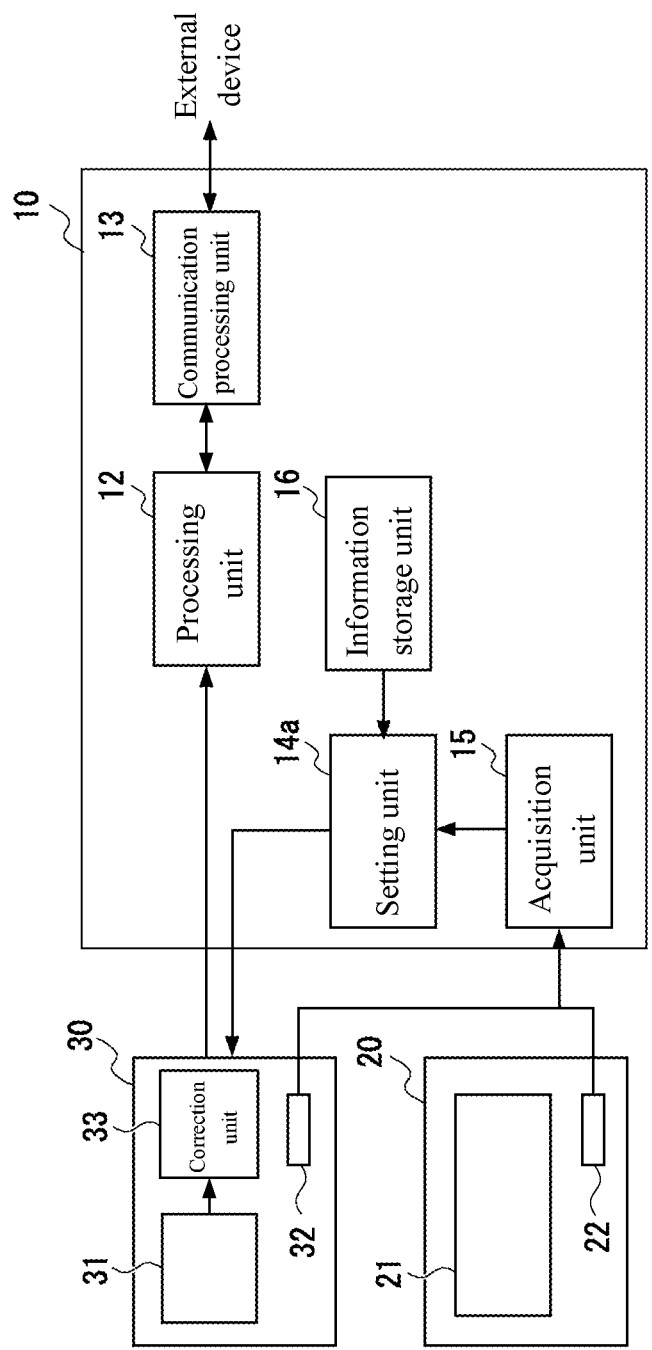
FIG. 12 is a diagram illustrating a modification example of the image sensor.

The image sensor 1 according to the first embodiment may be modified to a sensor that has a configuration illustrated in FIG. 12, that is, a sensor in which a correction unit 33 for performing distortion aberration correction is provided on the imaging module 30 side and a setting unit 14a for setting the distortion aberration characteristic information and the size information in the correction unit 33 is provided within the main body module 10. The same modification can also be made to the image sensor 1 according to the second embodiment.

Figure 13:
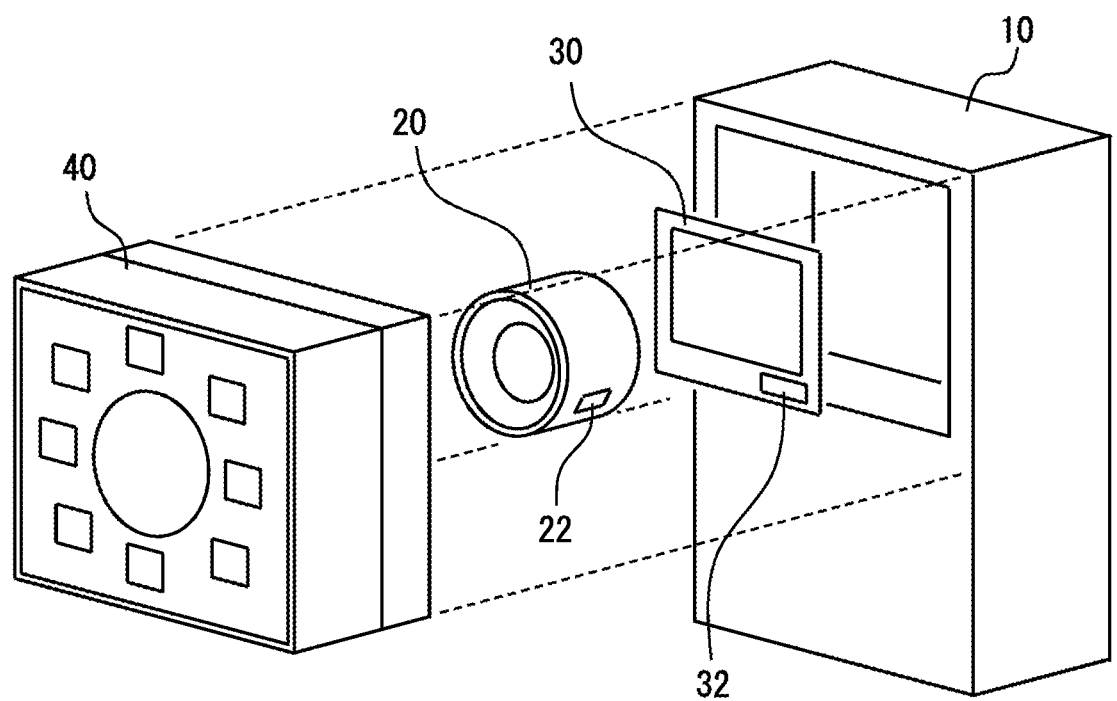
FIG. 13 is a diagram illustrating a modification example of the image sensor.

The lens module 20 may be modified to a module including a light source (LED or the like) for illuminating a subject. In addition, as schematically illustrated in FIG. 13, the main body module 10 may be modified to a module on which a light source for illumination and a light source for illuminating the subject can also be mounted. In a case where the imaging elements 31 within the respective imaging modules 30 have the same pixel size, the size information may be set to be only the number of pixels, and the setting units 14 and 14a may be configured as a unit which sets the size information (that is, the number of pixels) acquired from the imaging module 30 and a preset pixel size in the correction units 11 and 33. Further, in a case where the imaging elements 31 within the respective imaging modules 30 have the same number of pixels, the size information may be set to be only a pixel size, and the setting units 14 and 14a may be configured as a unit that sets the size information (that is, the pixel size) acquired from the imaging module 30 and a preset number of pixels in the correction units 11 and 33.

<Appendix>

1. An image sensor including:
a main body module (10); and
a lens module (20) and an imaging module (30) which are mounted on the main body module (10),
wherein the main body module (10) comprises:
a first acquisition unit (15) which acquires an imaging module form information indicating a form of the imaging module (30) from the mounted imaging module (30) and acquires a lens module form information indicating a form of the lens module (20) from the mounted lens module (20),
a second acquisition unit (14) which acquires a size information indicating a number of pixels and/or a pixel size of an imaging element within the mounted imaging module (30) and a distortion aberration characteristic information indicating distortion aberration characteristics of an optical system (21) within the mounted lens module (20) from a predetermined device by using the imaging module form information and the lens module form information acquired by the first acquisition unit (15), and
a correction unit (11) which performs distortion aberration correction on an image data output by the imaging module (30), using the size information and the distortion aberration characteristic information acquired by the second acquisition unit (14).

2. An image sensor including:
a main body module (10); and
a lens module (20) and an imaging module (30) which are mounted on the main body module (10),
wherein the imaging module (30) comprises:
an imaging element (31), and
a correction unit (33) which sets an information for distortion aberration correction and performs distortion aberration correction on an image data output by the imaging element by using the set information for distortion aberration correction, and
the main body module (10) comprises:
a first acquisition unit (15) which acquires an imaging module form information indicating a form of the imaging module (30) from the mounted imaging module (30) and acquires a lens module form information indicating a form of the lens module (20) from the mounted lens module (20),
a second acquisition unit (14a) which acquires a size information indicating a number of pixels and/or a pixel size of the imaging element within the mounted imaging module (30) and a distortion aberration characteristic information indicating distortion aberration characteristics of an optical system within the mounted lens module (20) from a predetermined device by using the imaging module form information and the lens module form information acquired by the first acquisition unit (15), and
a setting unit (14a) which sets the size information and the distortion aberration characteristic information acquired by the second acquisition unit (14a) in the correction unit (33) of the imaging module (30) as the information for distortion aberration correction.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. An image sensor comprising:
a main body module; and
a lens module and an imaging module mounted on the main body module,
wherein the main body module comprises a hardware controller configured to:
acquire an imaging module form information indicating a form of the imaging module from the mounted imaging module and acquire a lens module form information indicating a form of the lens module from the mounted lens module, acquire a size information indicating a number of pixels and/or a pixel size of an imaging element within the mounted imaging module and a distortion aberration characteristic information indicating distortion aberration characteristics of an optical system within the mounted lens module from a predetermined device by using the imaging module form information and the lens module form information, and perform distortion aberration correction on an image data output by the imaging module using the size information and the distortion aberration characteristic information.

2. An image sensor comprising:

a main body module; and a lens module and an imaging module mounted on the main body module, wherein the imaging module comprises:

an imaging element, and a first hardware controller, configured to set an information for distortion aberration correction and perform distortion aberration correction on an image data output by the imaging element by using the set information for distortion aberration correction, and the main body module comprises a second hardware controller configured to:

acquire an imaging module form information indicating a form of the imaging module from the mounted imaging module and acquire a lens module form information indicating a form of the lens module from the mounted lens module, acquire a size information indicating a number of pixels and/or a pixel size of the imaging element within the mounted imaging module and a distortion aberration characteristic information indicating distortion aberration characteristics of an optical system within the mounted lens module from a predetermined device by using the imaging module form information and the lens module form information, and set the size information and the distortion aberration characteristic information of the imaging module as the information for distortion aberration correction.

3. The image sensor according to claim 1, wherein the lens module includes a memory that stores the lens module form information indicating a form of the lens module, and the hardware controller of the main body module acquires the lens module form information by accessing the memory within the lens module.

4. The image sensor according to claim 1, wherein the imaging module includes a memory that stores the imaging module form information indicating a form of the imaging module, and the hardware controller of the main body module acquires the imaging module form information by accessing the memory within the imaging module.

5. The image sensor according to claim 1, wherein the predetermined device is a non-volatile memory included in the main body module.

6. The image sensor according to claim 1, wherein the predetermined device is a device provided outside the main body module.

7. The image sensor according to claim 1, wherein the predetermined device stores the distortion aberration characteristic information for each zoom setting value capable of being set in a zoomable lens module with respect to the lens module, and the hardware controller of the main body module acquires the distortion aberration characteristic information associated with the lens module form information and the zoom setting value of the zoomable lens module mounted on the main body module from the predetermined device in a case where the zoomable lens module is mounted on the main body module.

8. The image sensor according to claim 3, wherein the imaging module includes a memory that stores the imaging module form information indicating a form of the imaging module, and the hardware controller of the main body module acquires the imaging module form information by accessing the memory within the imaging module.

9. The image sensor according to claim 3, wherein the predetermined device stores the distortion aberration characteristic information for each zoom setting value capable of being set in a zoomable lens module with respect to the lens module, and the hardware controller of the main body module acquires the distortion aberration characteristic information associated with the lens module form information and the zoom setting value of the zoomable lens module mounted on the main body module from the predetermined device in a case where the zoomable lens module is mounted on the main body module.

10. The image sensor according to claim 4, wherein the predetermined device stores the distortion aberration characteristic information for each zoom setting value capable of being set in a zoomable lens module with respect to the lens module, and the hardware controller of the main body module acquires the distortion aberration characteristic information associated with the lens module form information and the zoom setting value of the zoomable lens module mounted on the main body module from the predetermined device in a case where the zoomable lens module is mounted on the main body module.

11. The image sensor according to claim 5, wherein the predetermined device stores the distortion aberration characteristic information for each zoom setting value capable of being set in a zoomable lens module with respect to the lens module, and the hardware controller of the main body module acquires the distortion aberration characteristic information associated with the lens module form information and the zoom setting value of the zoomable lens module mounted on the main body module from the predetermined device in a case where the zoomable lens module is mounted on the main body module.

12. The image sensor according to claim 2, wherein the lens module includes a memory that stores the lens module form information indicating a form of the lens module, and the second hardware controller of the main body module acquires the lens module form information by accessing the memory within the lens module.

13. The image sensor according to claim 2, wherein the imaging module includes a memory that stores the imaging module form information indicating a form of the imaging module, and the second hardware controller of the main body module acquires the imaging module form information by accessing the memory within the imaging module.

14. The image sensor according to claim 2, wherein the predetermined device is a non-volatile memory included in the main body module.

15. The image sensor according to claim 2,
wherein the predetermined device is a device provided outside the main body module.

16. The image sensor according to claim 2,
wherein the predetermined device stores the distortion aberration characteristic information for each zoom setting value capable of being set in a zoomable lens module with respect to the lens module, and the second hardware controller of the main body module acquires the distortion aberration characteristic information associated with the lens module form information and the zoom setting value of the zoomable lens module mounted on the main body module from the predetermined device in a case where the zoomable lens module is mounted on the main body module.

17. The image sensor according to claim 12,
wherein the imaging module includes a memory that stores the imaging module form information indicating a form of the imaging module, and the second hardware controller of the main body module acquires the imaging module form information by accessing the memory within the imaging module.

18. The image sensor according to claim 12,
wherein the predetermined device stores the distortion aberration characteristic information for each zoom setting value capable of being set in a zoomable lens module with respect to the lens module, and the second hardware controller of the main body module acquires the distortion aberration characteristic information associated with the lens module form information and the zoom setting value of the zoomable lens module mounted on the main body module from the predetermined device in a case where the zoomable lens module is mounted on the main body module.

19. The image sensor according to claim 13,
wherein the predetermined device stores the distortion aberration characteristic information for each zoom setting value capable of being set in a zoomable lens module with respect to the lens module, and the second hardware controller of the main body module acquires the distortion aberration characteristic information associated with the lens module form information and the zoom setting value of the zoomable lens module mounted on the main body module from the predetermined device in a case where the zoomable lens module is mounted on the main body module.

20. The image sensor according to claim 14,
wherein the predetermined device stores the distortion aberration characteristic information for each zoom setting value capable of being set in a zoomable lens module with respect to the lens module, and the second hardware controller of the main body module acquires the distortion aberration characteristic information associated with the lens module form information and the zoom setting value of the zoomable lens module mounted on the main body module from the predetermined device in a case where the zoomable lens module is mounted on the main body module.

* * * * *